United States Patent
Mishra

(10) Patent No.: US 11,131,358 B2
(45) Date of Patent: Sep. 28, 2021

(54) ENERGY ABSORBING BEAM

(71) Applicant: GM Global Technology Operations LLC, Detroit, MI (US)

(72) Inventor: Devanjan Mishra, Bhopal (IN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 134 days.

(21) Appl. No.: 16/363,512

(22) Filed: Mar. 25, 2019

(65) Prior Publication Data
US 2020/0309227 A1  Oct. 1, 2020

(51) Int. Cl.
*F16F 7/12* (2006.01)
*B62D 21/15* (2006.01)

(52) U.S. Cl.
CPC .............. *F16F 7/128* (2013.01); *B62D 21/15* (2013.01); *F16F 2234/06* (2013.01)

(58) Field of Classification Search
CPC .. F16F 7/12; F16F 7/121; B60R 19/18; B60R 2019/186; B60R 2019/1866; B60R 2019/182
See application file for complete search history.

(56) References Cited

U.S. PATENT DOCUMENTS

| | | | | |
|---|---|---|---|---|
| 3,995,901 A * | 12/1976 | Filbert, Jr. | ............... | B60R 19/18 293/136 |
| 4,165,113 A * | 8/1979 | Casse | ...................... | B60R 19/18 188/268 |
| 4,221,413 A * | 9/1980 | Bonnetain | ............... | B60R 19/18 188/377 |
| 4,227,593 A * | 10/1980 | Bricmont | ................. | G21D 1/02 188/377 |
| 4,856,833 A * | 8/1989 | Beekman | ................ | B60R 19/18 293/120 |
| 5,727,826 A * | 3/1998 | Frank | ....................... | B60J 5/042 293/102 |
| 5,746,419 A * | 5/1998 | McFadden | .............. | B60R 19/18 188/377 |
| 6,808,215 B2 * | 10/2004 | Sakuma | .................. | B60R 19/34 293/102 |
| 9,302,638 B2 * | 4/2016 | Mana | ....................... | B60R 19/18 |
| 9,751,478 B2 * | 9/2017 | Terada | .................... | B60R 19/18 |
| 2005/0158573 A1 * | 7/2005 | Elzey | ...................... | F03G 7/065 428/593 |
| 2005/0287371 A1 * | 12/2005 | Chaudhari | ............. | B60R 19/18 428/412 |
| 2008/0067838 A1 * | 3/2008 | Nakamae | ............. | B62D 25/084 296/203.02 |
| 2010/0279140 A1 * | 11/2010 | Impero | ................... | B60R 21/04 428/593 |

(Continued)

FOREIGN PATENT DOCUMENTS

| | | | | |
|---|---|---|---|---|
| DE | 10205627 A1 * | 8/2003 | ............. | B60R 19/18 |
| WO | WO-2010013713 A1 * | 2/2010 | ............. | B60R 19/18 |

*Primary Examiner* — Bradley T King

(57) ABSTRACT

An energy absorbing beam comprises a top plate and a bottom plate, a plurality of upper pillars extending from the top plate toward the bottom plate, a plurality of lower pillars extending from the bottom plate toward the top plate, and a first beam extending laterally between the top plate and the bottom plate and attached to the upper and lower pillars, wherein energy from an impact onto the top or bottom plate is transferred through the upper and lower pillars and absorbed by the first beam.

5 Claims, 5 Drawing Sheets

(56) References Cited

U.S. PATENT DOCUMENTS

| | | | |
|---|---|---|---|
| 2012/0139273 A1* | 6/2012 | Jeong | F16F 7/121 |
| | | | 293/132 |
| 2014/0203592 A1* | 7/2014 | Nagwanshi | B62D 29/001 |
| | | | 296/187.01 |
| 2016/0264082 A1* | 9/2016 | Berger | B29C 44/5681 |
| 2016/0353825 A1* | 12/2016 | Bottlang | B32B 3/12 |
| 2017/0058985 A1* | 3/2017 | Martino Gonzalez | F16F 7/00 |
| 2017/0106429 A1* | 4/2017 | Nakanishi | B21D 47/02 |
| 2017/0144618 A1* | 5/2017 | Martini | B60R 19/18 |
| 2017/0188650 A1* | 7/2017 | Hector, Jr. | B32B 15/043 |
| 2017/0327065 A1* | 11/2017 | So | B60R 19/26 |
| 2018/0265023 A1* | 9/2018 | Faruque | B29C 48/0021 |
| 2019/0039541 A1* | 2/2019 | Tyan | B60R 19/18 |
| 2019/0315298 A1* | 10/2019 | Romero | F16F 7/12 |

* cited by examiner

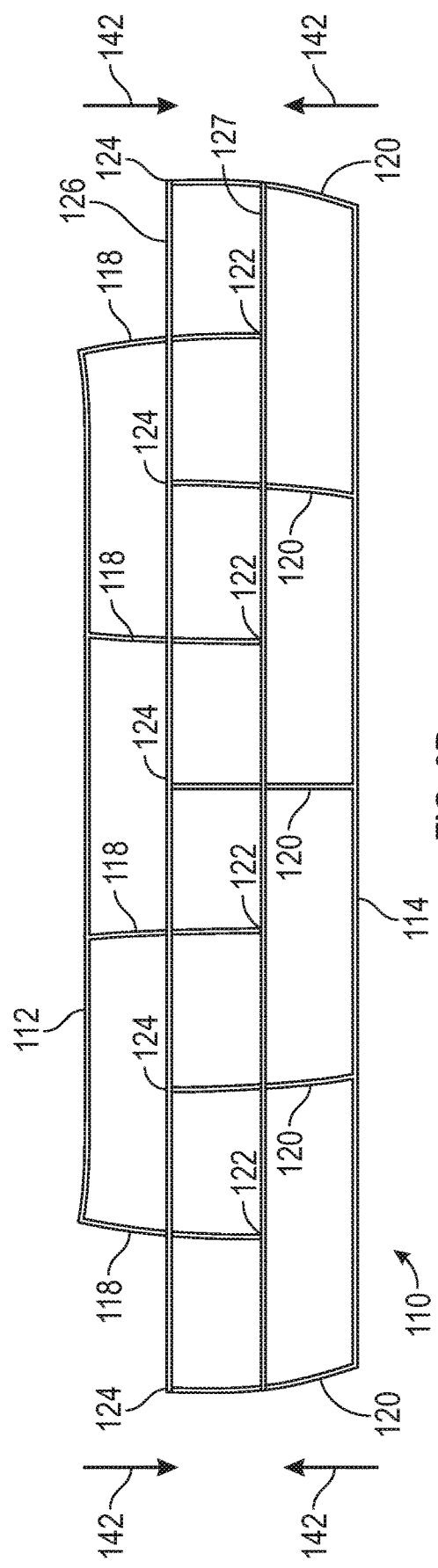
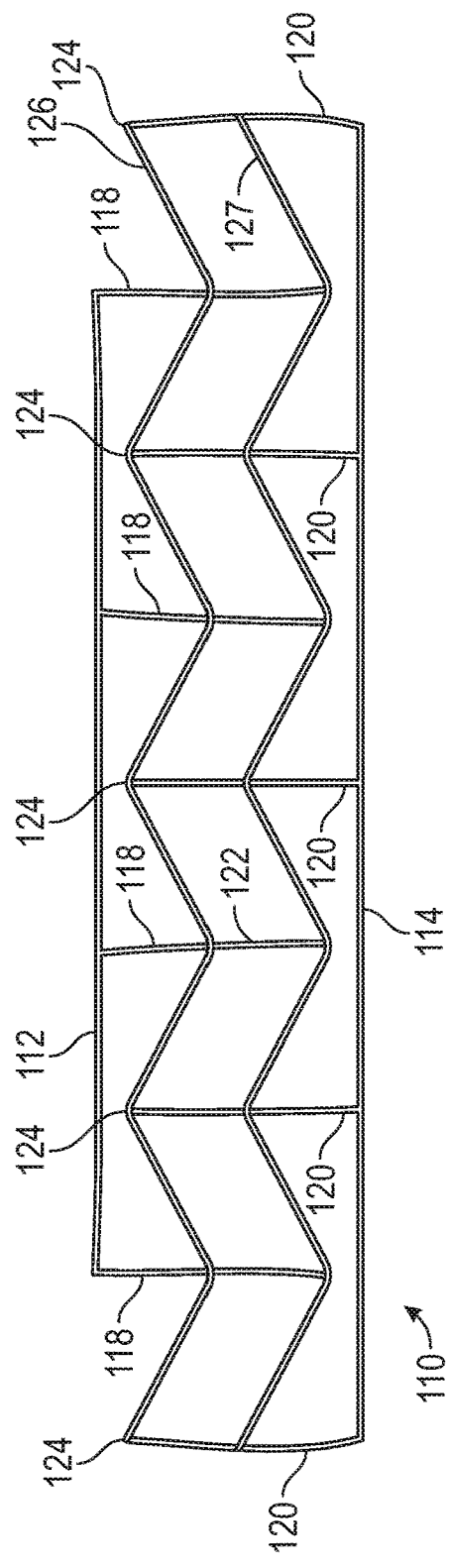
FIG. 3B
FIG. 3C

ENERGY ABSORBING BEAM

INTRODUCTION

The present disclosure relates to an energy absorbing beam. Energy absorbing structure is used in many applications where absorption of energy is needed. For instance, within an automobile, energy absorbing structure provides a crumple zone to absorb the energy of a crash. This helps to cushion the passengers within the automobile and prevent injury in the event of a crash.

Existing energy absorbing structures have limitations. For example, existing energy absorbing structures are designed for a specific application and may only be suitable for that particular application. They are not adjustable to be suitable for other applications. Additionally, existing energy absorption structures sometimes rely on catastrophic failure of the structure to absorb energy. Energy absorbing structures that fracture under impact are difficult to control, which makes it difficult to predict how the structure will react to an impact.

Thus, while current energy absorbing structures achieve their intended purpose, there is a need for a new and improved energy absorbing structure that provides predictable and repeatable performance characteristics and provides tunability to allow the structure to be flexible and able to be customized for different applications.

SUMMARY

According to several aspects of the present disclosure, an energy absorbing beam comprises a top plate and a bottom plate, a plurality of upper pillars extending from the top plate toward the bottom plate, a plurality of lower pillars extending from the bottom plate toward the top plate, and a first beam extending laterally between the top plate and the bottom plate and attached to the upper and lower pillars, wherein energy from an impact onto the top or bottom plate is transferred through the upper and lower pillars and absorbed by the first beam.

According to another aspect of the present disclosure, the first beam has a curved shape including a plurality of alternating peaks and valleys, a distal end of one of the plurality of upper pillars being attached to each of the plurality of peaks and a distal end of one of the plurality of lower pillars being attached to each of the plurality of valleys.

According to another aspect of the present disclosure, impact onto either the top plate or the bottom plate acts to push the top plate toward the bottom plate, wherein the first beam bends as the plurality of upper pillars moves toward the bottom plate and the plurality of lower pillars moves toward the top plate.

According to another aspect of the present disclosure, the upper and lower pillars prevent lateral expansion of the first beam, wherein as the plurality of upper pillars moves toward the bottom plate and the plurality of lower pillars moves toward the top plate, the first beam bends due to compression between adjacent upper and lower pillars.

According to another aspect of the present disclosure, each of the plurality of upper pillars is straight and substantially perpendicular to the top plate, and each of the plurality of lower pillars is straight and substantially perpendicular to the bottom plate.

According to another aspect of the present disclosure, each of the upper and lower pillars are adapted to transfer substantially all of the energy from an impact to the top and bottom plates through the upper and lower pillars to the first beam, and the first beam is adapted to bend to absorb the energy of the impact.

According to another aspect of the present disclosure, after bending of the first beam the energy absorbing beam continues to absorb the energy of the impact through bending of the upper and lower pillars and the first beam.

According to another aspect of the present disclosure, the energy absorbing beam further comprises a second beam, spaced from the first beam, extending laterally between the top plate and the bottom plate and attached to the upper and lower pillars, wherein energy from an impact onto the top or bottom plate is transferred through the upper and lower pillars and absorbed by the first and second beams.

According to another aspect of the present disclosure, the first beam has a curved shape including a plurality of alternating peaks and valleys, and the second beam has a shape including a plurality of alternating peaks and valleys aligned with the peaks and valleys of the first beam, wherein one of the plurality of upper pillars is attached to each of the plurality of peaks of each of the first and second beams, and one of the plurality of lower pillars is attached to each of the plurality of valleys of each of the first and second beams.

According to another aspect of the present disclosure, impact onto either the top plate or the bottom plate acts to push the top plate toward the bottom plate, and the first and second beams are adapted to bend without fracturing as the plurality of upper pillars moves toward the bottom plate and the plurality of lower pillars moves toward the top plate.

According to another aspect of the present disclosure, the upper and lower pillars prevent lateral expansion of the first and second beams, wherein as the plurality of upper pillars moves toward the bottom plate and the plurality of lower pillars moves toward the top plate, the first and second beams are adapted to bend due to compression between adjacent upper and lower pillars.

According to another aspect of the present disclosure, the first beam has a curved shape including a plurality of alternating peaks and valleys, and the second beam has a curved shape including a plurality of alternating peaks and valleys that is shifted from the first beam, wherein the peaks of the first beam are aligned with the valleys of the second beam and the valleys of the first beam are aligned with the peaks of the second beam, wherein one of the plurality of upper pillars is attached to each of the plurality of peaks of the first beam, and one of the plurality of lower pillars is attached to each of the plurality of valleys the second beam.

According to another aspect of the present disclosure, the energy absorbing beam further comprises a plurality of intermediate pillars interconnecting the first beam and the second beam, wherein each intermediate pillar connects a valley of the first beam to an aligned peak of the second beam.

According to another aspect of the present disclosure, the energy absorbing beam further comprises a flat intermediate plate extending between the first and second beams an interconnecting the plurality of intermediate pillars.

According to another aspect of the present disclosure, impact onto either the top plate or the bottom plate acts to push the top plate toward the bottom plate, wherein the first and second beams bend as the plurality of upper pillars moves toward the bottom plate and the plurality of lower pillars moves toward the top plate.

According to another aspect of the present disclosure, the upper, lower and intermediate pillars prevent lateral expansion of the first and second beams, wherein as the plurality of upper pillars moves toward the bottom plate and the plurality of lower pillars moves toward the top plate, the first and second beams bend due to compression between adjacent upper and lower pillars and intermediate pillars.

According to another aspect of the present disclosure, each of the plurality of intermediate pillars is straight and substantially parallel to the upper and lower pillars.

According to another aspect of the present disclosure, each of the intermediate pillars are adapted to transfer energy between the first and second beams.

According to another aspect of the present disclosure, the plurality of intermediate pillars are adapted to withstand impact upon the top and bottom plates without bending.

According to another aspect of the present disclosure, after bending of the first and second beams the energy absorbing beam continues to absorb the energy of the impact through bending of the upper, lower, and intermediate pillars, and the first and second beams.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3B is a side view of the energy absorbing beam of FIG. 2, at an intermediate stage after impact;

FIG. 3C is a side view of the energy absorbing beam of FIG. 2, at a final deformed stage after impact.

DETAILED DESCRIPTION

Figure 1:
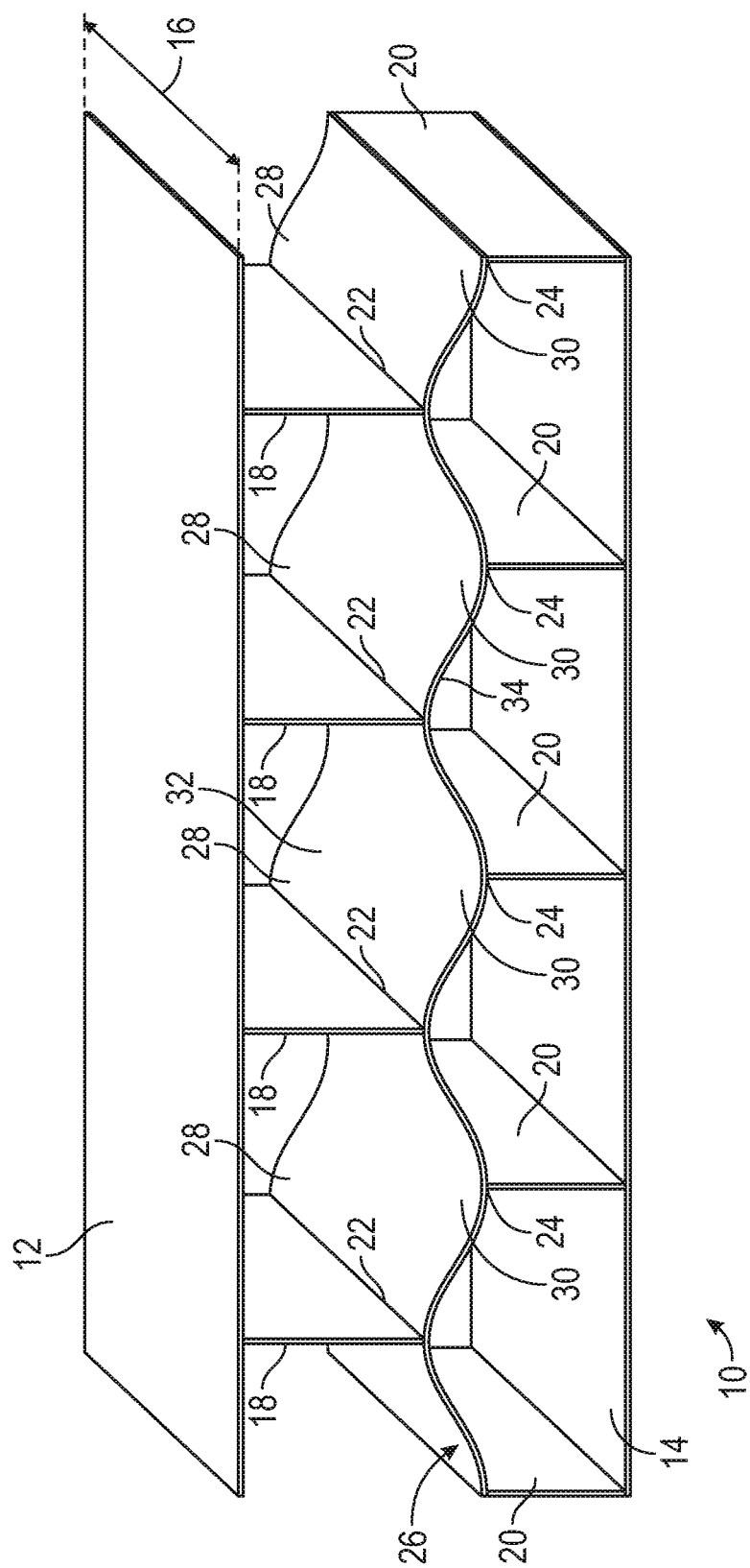
FIG. 1 is a perspective view of an energy absorbing beam according to an exemplary embodiment.

The following description is merely exemplary in nature and is not intended to limit the present disclosure, application, or uses. Referring to FIG. 1, an energy absorbing beam, according to an exemplary embodiment is shown generally at 10. The energy absorbing beam 10 comprises a top plate 12 and a bottom plate 14. The top plate 12 and bottom plate 14 are lie in parallel horizontal planes spaced apart from one another. The top plate 12 and bottom plate 14 define a width 16 of the energy absorbing beam 10.

A plurality of upper pillars 18 extend from the top plate 12 toward the bottom plate 14 and a plurality of lower pillars 20 extends from the bottom plate 14 upwards toward the top plate 12. The plurality of upper pillars 18 are spaced uniformly along the top plate 12. Each of the plurality of upper pillars 18 extends vertically straight downward toward the bottom plate 14, perpendicular to the top plate 12, along the entire width 16 of the energy absorbing beam 10. Each of the plurality of upper pillars 18 has a distal end 22 that is spaced a distance from the bottom plate 14. The plurality of lower pillars 20 are spaced uniformly along the bottom plate 14. Each of the plurality of lower pillars 20 extends vertically straight upward toward the top plate 12, perpendicular to the bottom plate 14, along the entire width 16 of the energy absorbing beam 10. Each of the plurality of lower pillars 20 has a distal end 24 that is spaced a distance from the top plate 12.

A first beam 26 extends laterally between the top plate 12 and the bottom plate 14. The first beam 26 is attached to the upper and lower pillars 18, 20. The first beam 26 has a curved shape including a plurality of alternating peaks 28 and valleys 30. This curved shape can be any suitable curved shape. By way of non-limiting examples, the curved shape may comprise shapes, including, but not limited to, a sinusoidal pattern, a C-shape or an inverted C-shape. The distal ends 22 of the upper pillars 18 are attached to a top surface 32 of the first beam 26 at the peaks 28. Each upper pillar 18 is attached to a peak 28 and each peak 28 is attached to an upper pillar 18. The distal ends 24 of the lower pillars 20 are attached to a bottom surface 34 of the first beam 26 at the valleys 30. Each lower pillar 20 is attached to a valley 30 and each valley 30 is attached to a lower pillar 20.

Energy from an impact onto the top or bottom plate 12, 14 is transferred through the upper and lower pillars 18, 20 and absorbed by the first beam 26. When the energy absorbing beam 10 is impacted on either the top plate 12 or the bottom plate 14, the top plate 12 and the bottom plate 14 are pushed together. The upper and lower pillars 18, 20 prevent lateral expansion of the first beam 26. As the plurality of upper pillars 18 moves toward the bottom plate 14 and the plurality of lower pillars 20 moves toward the top plate 12, the first beam 26 bends due to compression between adjacent upper and lower pillars 18, 20. The upper and lower pillars 18, 20 are adapted to transfer substantially all of the energy from an impact to the top and bottom plates 12, 14 to the first beam 26.

The energy absorbing beam 10 is adapted to withstand an impact in two stages. In a first stage, the upper and lower pillars 18, 20 are designed to withstand expected loads without bending, thereby transferring energy to the first beam 26. The first beam 26 is designed to bend and absorb the energy of the impact. This allows the energy of the impact to be absorbed in a controlled manner to efficiently absorb the energy in a predictable manner. Under a sufficiently large impact, once the first beam 26 has bent, the energy absorbing beam 10 will continue to deform in a second stage. In the second stage, the first beam 26 can no longer bend further without bending of the upper and lower pillars 18, 20. At this point, the energy absorbing beam 10 acts as a connected rib structure. During the second stage, the energy absorbing beam 10 will continue to absorb energy of the impact through bending (crushing) of both the first beam 26 and the upper and lower pillars 18, 20.

Figure 2:
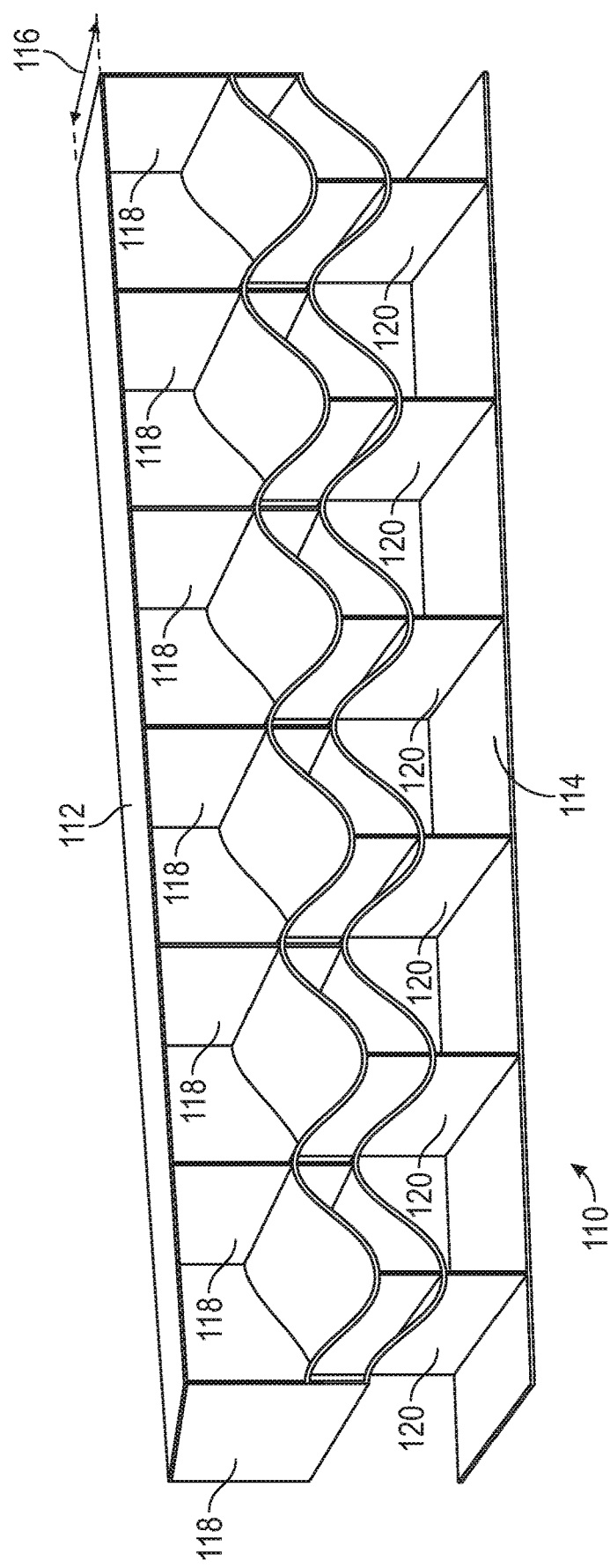
FIG. 2 is a perspective view of an energy absorbing beam according to another exemplary embodiment.
Figure 3A:
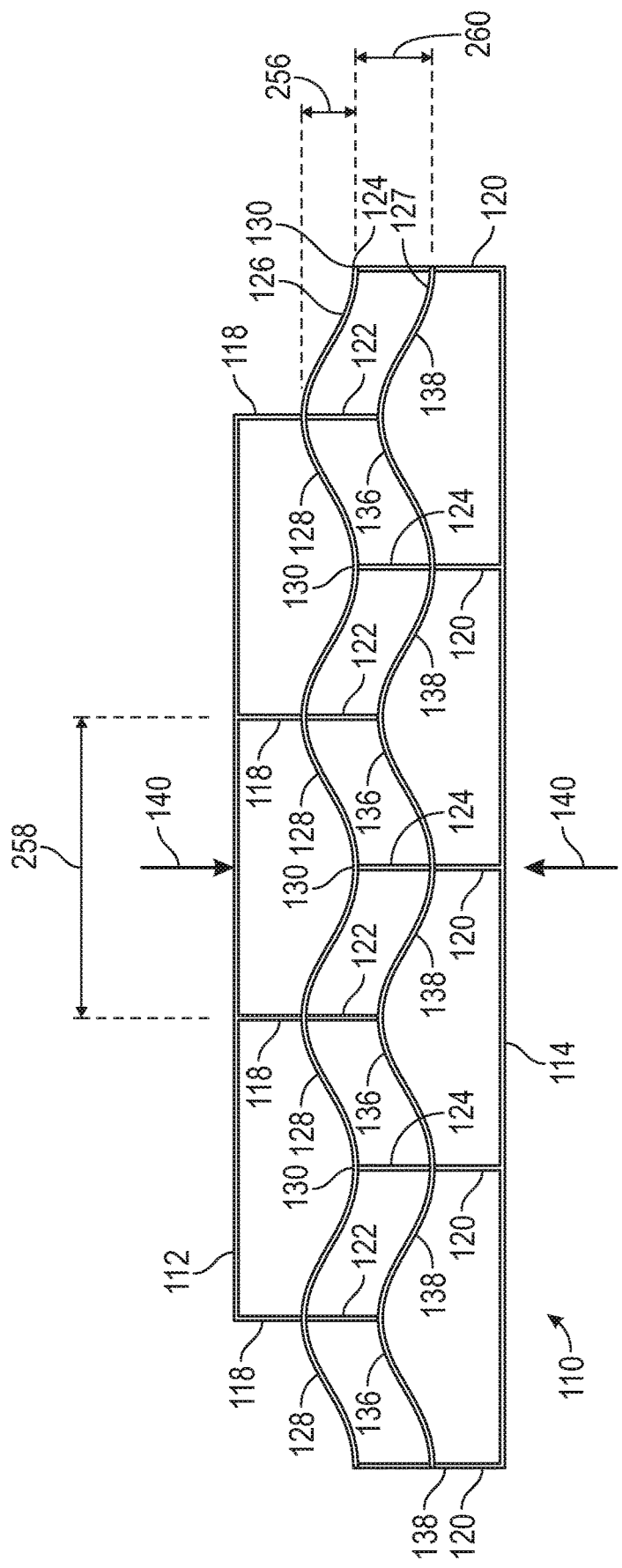
FIG. 3A is a side view of the energy absorbing beam of FIG. 2, prior to an impact.

Referring to FIG. 2 and FIG. 3A, an energy absorbing bean of another exemplary embodiment is shown generally at 110. The energy absorbing beam 110 comprises a top plate 112 and a bottom plate 114. The top plate 112 and bottom plate 114 lie in parallel horizontal planes spaced apart from one another. The top plate 112 and bottom plate 114 define a width 116 of the energy absorbing beam 110.

A plurality of upper pillars 118 extend from the top plate 112 toward the bottom plate 114 and a plurality of lower pillars 120 extend from the bottom plate 114 toward the top plate 112. The plurality of upper pillars 118 are spaced uniformly along the top plate 112. Each of the plurality of upper pillars 118 extends vertically straight downward toward the bottom plate 114, perpendicular to the top plate 112, along the entire width 116 of the energy absorbing beam 110. Each of the plurality of upper pillars 118 has a distal end 122 that is spaced a distance from the bottom plate 114. The plurality of lower pillars 120 are spaced uniformly along the bottom plate 114. Each of the plurality of lower pillars 120 extends vertically straight upward toward the top plate 112, perpendicular to the bottom plate 114, along the entire width 116 of the energy absorbing beam 110. Each of the plurality of lower pillars 120 has a distal end 124 that is spaced a distance from the top plate 112.

A first beam 126 extends laterally between the top plate 112 and the bottom plate 114. The first beam 126 is attached to the upper and lower pillars 118, 120. The first beam 126 has a curved shape including a plurality of alternating peaks 128 and valleys. This curved shape can be any suitable curved shape. By way of non-limiting examples, the curved shape may comprise shapes, including, but not limited to, a sinusoidal pattern, a C-shape or an inverted C-shape. A second beam 127, spaced from the first beam 126, extends laterally between the top plate 112 and the bottom plate 114. The second beam 127 is attached to the upper and lower pillars 118, 120. The second beam 127 has a shape including a plurality of alternating peaks 136 and valleys, aligned with the first beam 126.

The aligned peaks 128, 136 of the first and second beams 126, 127 are attached, spaced from one another, to the upper pillars 118. Each upper pillar 118 is attached to a peak 128 of the first beam 126 and the aligned peak 136 of the second beam 127, and each aligned pair of peaks 128, 136 from the first and second beams 126, 127 are attached to an upper pillar 118. The aligned valleys 130, 138 of the first and second beams 126, 127 are attached, spaced from one another, to the lower pillars 120. Each lower pillar 120 is attached to a valley 130 of the first beam 126 and the aligned valley 138 of the second beam 127, and each aligned pair of valleys 130, 138 from the first and second beams 126, 127 are attached to a lower pillar 120.

Energy from an impact onto the top or bottom plate 112, 114 is transferred through the upper and lower pillars 118, 120 and absorbed by the first and second beams 126, 127. Referring to FIGS. 3A, 3B and 3C, when the energy absorbing beam 110 is impacted on either the top plate 112 or the bottom plate 114, as indicated in FIG. 3A at 140, the force pushes the top plate 112 and bottom plate 114 toward each other, as indicated at 142. One of the advantages of the energy absorbing beam 110 of the present disclosure is that the energy absorbing beam 110 will react the same way to impacts that come directly at the top and bottom plates 112, 114 perpendicularly as it does to impacts that come from different directions at an angle relative to the top and bottom plates 112, 114.

The upper and lower pillars 118, 120 prevent lateral expansion of the first and second beams 126, 127. Referring to FIG. 3B, as the plurality of upper pillars 118 moves toward the bottom plate 114 and the plurality of lower pillars 120 moves toward the top plate 112, the first and second beams 126, 127 bend due to compression between adjacent upper and lower pillars 118, 120.

The energy absorbing beam 110 is adapted to withstand an impact in two stages. In a first stage, the upper and lower pillars 118, 120 are adapted to transfer substantially all of the energy from an impact to the top and bottom plates 112, 114 to the first and second beams 126, 127. The upper and lower pillars 118, 120 are designed to withstand expected loads without bending, thereby transferring energy to the first and second beams 126, 127. This allows the energy of the impact to be absorbed in a controlled manner to efficiently absorb the energy in a predictable manner. Under a sufficiently large impact, once the first and second beams 126, 127 have bent and completely inverted, as shown in FIG. 3C, the energy absorbing beam 110 will continue to deform in a second stage. In the second stage, the first and second beams 126, 127 cannot bend beyond the state shown in FIG. 3C without bending of the upper and lower pillars 118, 120. At this point, the energy absorbing beam 110 acts as a connected rib structure. During the second stage, the energy absorbing beam 110 will continue to absorb energy of the impact through bending (crushing) of both the first and second beams 126, 127 and the upper and lower pillars 118, 120.

Figure 4:
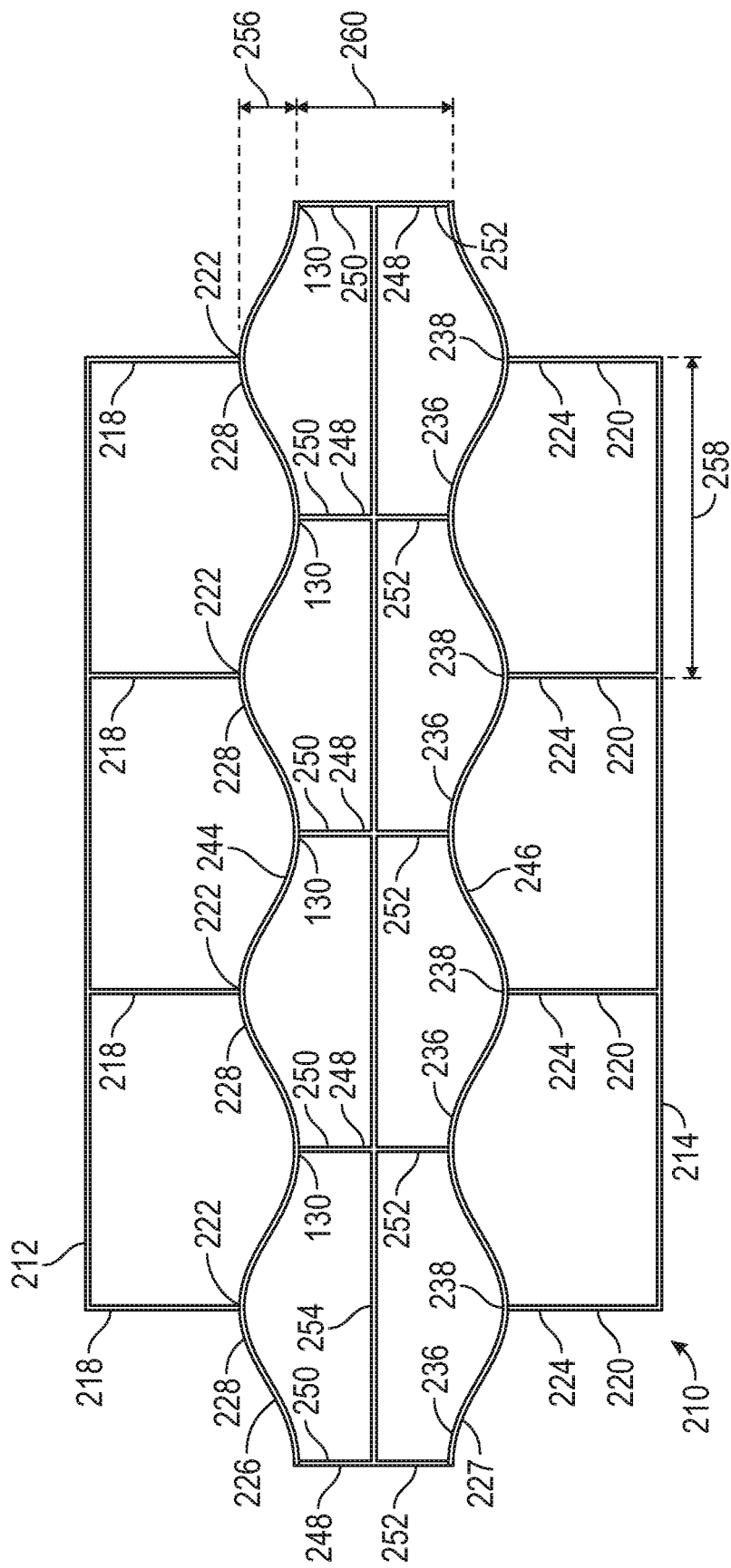
FIG. 4 is a perspective view of an energy absorbing beam according to another exemplary embodiment.

Referring to FIG. 4, another exemplary embodiment of an energy absorbing beam is shown generally at 210. The energy absorbing beam includes a top plate 212 and a bottom plate 214. The top plate 212 and bottom plate 214 lie in parallel horizontal planes spaced apart from one another. The top plate 212 and bottom plate 214 define a width 216 of the energy absorbing beam 210.

A plurality of upper pillars 218 extend from the top plate 212 toward the bottom plate 214 and a plurality of lower pillars 220 extend from the bottom plate 214 toward the top plate 212. The plurality of upper pillars 218 are spaced uniformly along the top plate 212. Each of the plurality of upper pillars 218 extends vertically straight downward toward the bottom plate 214, perpendicular to the top plate 212, along the entire width 216 of the energy absorbing beam 210. Each of the plurality of upper pillars 218 has a distal end 222 that is spaced a distance from the bottom plate 214. The plurality of lower pillars 220 are spaced uniformly along the bottom plate 214. Each of the plurality of lower pillars 220 extends vertically straight upward toward the top plate 212, perpendicular to the bottom plate 214, along the entire width 216 of the energy absorbing beam 210. Each of the plurality of lower pillars 220 has a distal end 224 that is spaced a distance from the top plate 212.

A first beam 226 extends laterally between the top plate 212 and the bottom plate 214. The first beam 226 is attached to the upper and lower pillars 218, 220. The first beam 226 has a curved shape including a plurality of alternating peaks 228 and valleys 230. This curved shape can be any suitable curved shape. By way of non-limiting examples, the curved shape may comprise shapes, including, but not limited to, a sinusoidal pattern, a C-shape or an inverted C-shape. A second beam 227, spaced from the first beam 226, extends laterally between the top plate 212 and the bottom plate 214. The second beam 227 is attached to the upper and lower pillars 218, 220. The second beam 227 has a curved shape including a plurality of alternating peaks 236 and valleys 238, that is shifted relative to the first beam 226. The peaks 228 of the first beam 226 are aligned with the valleys 238 of the second beam 227 and the valleys 230 of the first beam 226 are aligned with the peaks 236 of the second beam 227.

A distal end 222 of one of the upper pillars 218 is attached to a top surface 232 of the first beam 226 at each peak 228. Each upper pillar 218 is attached to a peak 228 of the first beam 226 and each peak 228 of the first beam 226 is attached to an upper pillar 218. A distal end 224 of one of the lower pillars 220 is attached to a bottom surface 246 of the second beam 227 at each valley 238. Each lower pillar 220 is attached to a valley 238 of the second beam 227 and each valley 238 of the second beam 227 is attached to a lower pillar 220.

A plurality of intermediate pillars 248 interconnects the first beam 226 and the second beam 227. Each intermediate pillar 248 extends vertically between the first and second beams 226, 227, parallel to the upper and lower pillars 218, 220. Each intermediate pillar 248 interconnects a valley 230 of the first beam 226 with an aligned peak 236 of the second beam 227. Each of the intermediate pillars 248 has a first end 250 that connects to the bottom surface 234 of the first beam 226 at a valley 230 of the first beam 226, and a second end 252 that connects to the top surface 244 of the second beam 227 at a peak 236 of the second beam 227.

A flat intermediate plate 254 may extend horizontally between the first and second beams 226, 227 interconnecting the intermediate pillars 248 to one another at a point approximately half way between the first and second beams 226, 227. The intermediate plate 254 lies in a horizontal plane that is parallel to the horizontal plane of the top and bottom plates 212, 214. The intermediate plate 254 provides stability to keep the intermediate pillars 248 from buckling when the energy absorbing beam 210 experiences an impact. The presence of the intermediate plate 254 is based on the design characteristics desired in the energy absorbing beam 210.

Energy from an impact onto the top or bottom plate 212, 214 is transferred through the upper and lower pillars 218, 220 and absorbed by the first and second beams 226, 227. When the energy absorbing beam 210 is impacted on either the top plate 212 or the bottom plate 214 the force pushes the top plate 212 and bottom plate 214 toward each other. The upper, lower and intermediate pillars 218, 220, 248 prevent lateral expansion of the first and second beams 226, 227. As the plurality of upper pillars 218 moves toward the bottom plate 214 and the plurality of lower pillars 220 moves toward the top plate 212, the first and second beams 226, 227 bend due to compression between adjacent upper and lower pillars 218, 220 and intermediate pillars 248. The upper and lower pillars 218, 220 are adapted to transfer substantially all of the energy from an impact to the top and bottom plates 212, 214 to the first and second beams 226, 227. The intermediate pillars 248 are adapted to transfer energy between the first and second beams 226, 227 to evenly distribute the impact forces between the first and second beams 226, 227.

The energy absorbing beam 210 is adapted to withstand an impact in two stages. In a first stage, the upper, lower and intermediate pillars 218, 220, 248 are designed to withstand expected loads without bending, thereby transferring energy to the first and second beams 226, 227. The first and second beams 226, 227 are designed to bend and absorb the energy of the impact. This allows the energy of the impact to be absorbed in a controlled manner to efficiently absorb the energy in a predictable manner. Under a sufficiently large impact, once the first and second beams 226, 227 have bent and completely inverted, the energy absorbing beam 210 will continue to bend in a second stage. In the second stage, the first and second beams 226, 227 cannot bend further without bending of the upper, lower and intermediate pillars 218, 220, 248. At this point, the energy absorbing beam 210 acts as a connected rib structure. During the second stage, the energy absorbing beam 210 will continue to absorb energy of the impact through bending (crushing) of both the first and second beams 226, 227 and the upper, lower and intermediate pillars 218, 220, 248.

The stiffness and energy absorption characteristics of the energy absorbing beam are controlled by seven design parameters. These include the height of the curvature 256 in the first and second beams 226, 227, the thickness of the first and second beams, the thickness of the pillars, the length of a cell 258, the number of curved beams 26, 126, 127, 226, 227 characteristics of the material from which the beams 26, 126, 127, 226, 227 and pillars 18, 20, 118, 120, 218, 220, 248 are manufactured and the distance between the curved beams 260. A cell 258 is the distance between consecutive upper or lower pillars 18, 20, 118, 120, 218, 220.

An energy absorbing beam 10, 110, 210 of the present disclosure offers several advantages. These include the ability to effectively absorb the energy from impacts that hit the top and bottom plate 12, 14, 112, 114, 212, 214 directly as well as the energy from impacts that hit the top and bottom plates 12, 14, 112, 114, 212, 214 at an angle relative to the top and bottom plates 12, 14, 112, 114, 212, 214. Additionally, the energy absorbing beam 10, 110, 210 of the present disclosure reacts the same if the impact is on the top plate 12, 112, 212, the bottom plate 14, 114, 214, or both simultaneously. This provides bi-directional loading capability making the energy absorbing beam 10, 110, 210 suitable to a wider variety of applications.

The energy absorbing beam 10, 110, 210 of the present disclosure provides higher stiffness and energy absorption as compared to prior art beams that are similarly sized. The energy absorption beam 10, 110, 210 of the present disclosure uses bending, without destructive fracturing, to absorb the energy of an impact. The energy absorbing beam 10, 110, 210 can be designed to operate within the elastic/plastic deformation region of the beams 26, 126, 127, 226, 227 avoiding destructive failure modes that are unpredictable. The energy absorbing beams 10, 110, 210 of the present disclosure can be made from any suitable material that provides the elastic/plastic deformation characteristics needed for an application.

Furthermore, the energy absorbing beam 10, 110, 210 of the present disclosure can be tuned for specific applications. The energy absorption characteristics of the energy absorbing beam 10, 110, 210 can be tailored by adjusting one or more of the seven design parameters. This makes the energy absorbing beam 10, 110, 210 of the present disclosure flexible and applicable to a wide variety of applications.

It is to be understood that the energy absorbing beam 10, 110, 210 of the present disclosure may include any number of curved beams 26, 126, 127, 226, 227 depending on the desired design characteristics. The energy absorbing beam 10, 110, 210 of the present disclosure provides a structure that is adapted to absorb energy based two stages of deformation. Bending of the curved beams 26, 126, 127, 226, 227 during the first stage provides energy absorption beginning at the middle of the energy absorbing beam 10, 110, 210. This provides more uniform and faster energy absorption compared to known conventional structures. When the curved beams 26, 126, 127, 226, 227 have bent, or inverted and "bottomed out", further energy absorption requires deformation (bending, crushing) of the pillars 18, 20, 118, 120, 218, 220, 248, during the second stage. During the second stage, the energy absorption is spread outward toward the top and bottom plates.

In addition to modifying the 7 design parameters discussed above, the characteristics of the pillars 18, 20, 118, 120, 218, 220, 248 can be adjusted to tune the stiffness and energy absorption characteristics of the beam 10, 110, 210 during the second stage. This can be achieved by changing the thickness, spacing and orientation of the pillars 18, 20, 118, 120, 218, 220, 248.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. An energy absorbing beam, comprising:
a top plate and a bottom plate;

a plurality of upper pillars extending from the top plate toward the bottom plate, wherein each of the plurality of upper pillars is straight and substantially perpendicular to the top plate;

a plurality of lower pillars extending from the bottom plate toward the top plate, wherein each of the plurality of lower pillars is straight and substantially perpendicular to the bottom plate, the plurality of upper pillars and the plurality of lower pillars adapted to withstand expected loads without bending;

a first beam extending laterally between the top plate and the bottom plate and attached to the upper and lower pillars and adapted to deform and absorb energy of expected loads, wherein energy from an impact onto the top or bottom plate is transferred through the upper and lower pillars and absorbed by the first beam, the first beam having a curved shape including a plurality of alternating peaks and valleys, a distal end of one of the plurality of upper pillars being attached to each of the plurality of peaks and a distal end of one of the plurality of lower pillars being attached to each of the plurality of valleys;

wherein, under expected loads, each of the plurality of upper and lower pillars are adapted to transfer substantially all of the energy from the impact to the top and bottom plates through the plurality of upper and lower pillars to the first beam, and the first beam is adapted to bend to absorb the energy of the impact; and wherein, under an impact that exceeds expected loads, after the first beam has elastically deformed, the energy absorbing beam is adapted to continue to absorb energy through bending of both the first beam and the upper and lower pillars.

2. The energy absorbing beam of claim 1, wherein impact onto either the top plate or the bottom plate acts to push the top plate toward the bottom plate, wherein the first beam bends as the plurality of upper pillars moves toward the bottom plate and the plurality of lower pillars moves toward the top plate.

3. The energy absorbing beam of claim 1, further comprising:

a second beam, spaced from the first beam, extending laterally between the top plate and the bottom plate and attached to the upper and lower pillars, wherein energy from an impact onto the top or bottom plate is transferred through the upper and lower pillars and absorbed by the first and second beams.

4. The energy absorbing beam of claim 3, wherein the second beam has a curved shape including a plurality of alternating peaks and valleys aligned with the peaks and valleys of the first beam, wherein one of the plurality of upper pillars is attached to each of the plurality of peaks of each of the first and second beams, and one of the plurality of lower pillars is attached to each of the plurality of valleys of each of the first and second beams.

5. The energy absorbing beam of claim 4, wherein impact onto either the top plate or the bottom plate acts to push the top plate toward the bottom plate, and the first and second beams are adapted to bend without fracturing as the plurality of upper pillars moves toward the bottom plate and the plurality of lower pillars moves toward the top plate.

* * * * *